W. F. COCHRANE.
Assignor to himself and WARDER & CHILD.
BOLTING FLOUR.
No. 37,317.
Patented Jan. 6, 1863.
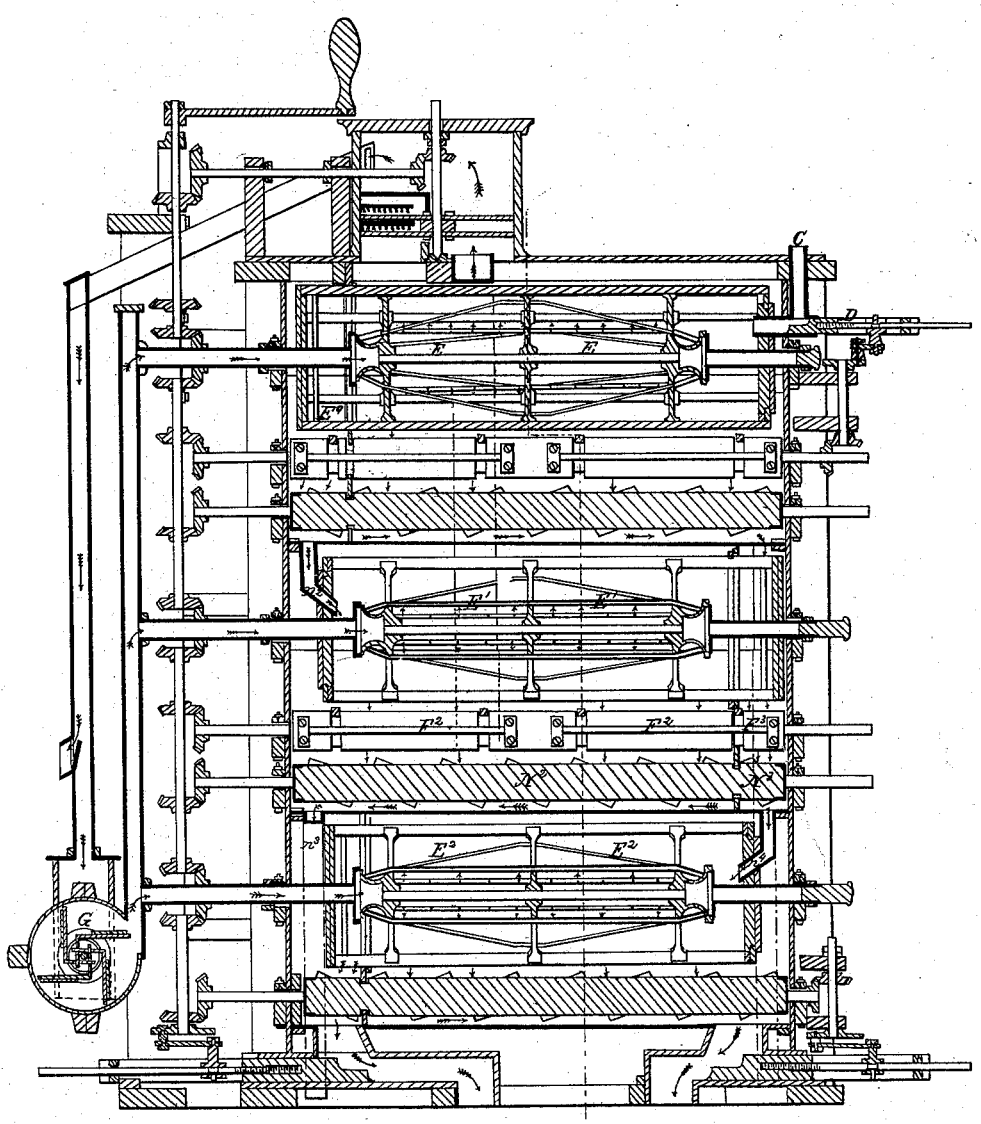

UNITED STATES PATENT OFFICE.

WILLIAM F. COCHRANE, OF SPRINGFIELD, OHIO, ASSIGNOR TO HIMSELF AND WARDER & CHILD, OF SAME PLACE.

IMPROVEMENT IN BOLTING FLOUR.

Specification forming part of Letters Patent No. 37,317, dated January 6, 1863.

*To all whom it may concern:*

Be it known that I, WILLIAM F. COCHRANE, of Springfield, in the county of Clark and State of Ohio, have invented a certain new and useful Method of Bolting Flour, (Case A,) of which the following is a full, clear, and exact description, reference being had to the accompanying drawing, making part of this specification, which represents a vertical longitudinal section through a bolting-chest to which my improvements are applied.

In the ordinary course of milling, the superfine flour is made on the head of the first, while the flour made on the tail of the first and throughout the whole of the second reel is returned to the head of the first reel, to be rebolted. The nature of the meal is such that in order to bolt it to the best advantage it is essential that the offal be kept in it during the process, otherwise the bolting-cloths would soon become choked. The sharp cutting-edges of the offal scour and clean the cloths, and also keep the meal "lightened up." Moreover, it requires all the offal that is in the wheat to make it bolt well. Therefore when all the flour made upon the tail-end of the first reel, and the whole of the second, is returned without any offal in it to the head of the first reel it becomes necessary to use a coarse cloth upon the first reel to avoid choking it. To avoid this objection, instead of separating the flour and offal and returning the former to the head of the first reel, I keep the offal running through the entire series of reels without returning the flour at all, by which means the proportion of offal is rapidly increased, thus enabling me to use a series of bolting-cloths of increasing fineness without danger of their choking. The offal, after passing through the series of reels, is conveyed into a "separator," which assorts the various grades. This separator consists of a reel clothed with a series of cloths of decreasing fineness, the finest being at its head. The "white middlings" come off first, mixed with the finest ship-stuff, then "ship-stuff," "shorts," and "bran." These white middlings are reground on a stone by themselves, and rebolted in the same manner as the meal. The flour produced by bolting them through the first reel is mixed with a suitable amount of coarse offal from the separator, and then bolted through a second and third reel, both of which are clothed with finer cloth than the first, the last being the finest of the three. The offal from the first reel is carried away finished, while that from the others is returned to the separator. The flour from the white middlings may be conveyed into a separate retort or receptacle prepared for it, whence it may be mixed with the other flour in any proportion desired, or be packed by itself.

In the accompanying drawing, which represents a convenient arrangement of parts for carrying out the objects of my invention, a bolting-chest is shown consisting of three reels, arranged one above the other.

It is deemed unnecessary here to describe in detail the construction and arrangement of the mechanism, as the invention claimed under this patent is not limited to such arrangement. The mechanism, moreover, is fully described in sundry other applications for Letters Patent filed simultaneously with this, and marked, respectively, "B," "C," and "D."

The operation of bolting is as follows: The meal is fed into the pump D through a spout, C. The pump injects the meal into the upper or superfine reel, E, by which it is bolted. The cloth upon this reel is coarser than that used upon the lower ones. The bolting is assisted by a strong blast from a fan, G. The fine flour made upon this reel is conveyed away in any proper manner into a suitable receptacle. The offal falls into a dead-air chamber, $E^9$, which is likewise provided with a suitable pump or valve to convey it away without permitting the air to escape with it. The offal passes down through a trough, $n^2$, and enters the second reel, $E'$. The flour made on this reel passes through its appropriate valve, $F^2$, conveyer $N^2$, and trough $n^3$ into a separate receptacle. The offal in like manner descends through its valve $F^3$, conveyer $N^3$, and trough $n^4$ to the third reel, $E^2$, where the same process is repeated. After passing through the third reel the meal is too much impoverished to be again bolted with advantage in its present condition. It is therefore passed through a separator, which divides it into white middlings, ship-stuff, shorts, and bran. The white middlings are reground, mixed with coarse offal, and rebolted, as hereinbefore described, thereby obtaining an increased quantity of flour, which may be stored by itself or mixed with the other flour, as desired. The flour made on each reel is collected in a separate receptacle. In some conditions of atmosphere the meal bolts so freely that the several grades may all be thrown together, but at other times it is more advantageous to keep them separate.

In the drawing the red arrows indicate the course taken by the flour in its passage through the chest, the blue ones the direction of the blast, and the black ones the course of the offal.

What I claim under this patent as my invention is—

1. Bolting the meal over a series of reels covered with cloths of increasing fineness, in combination with a blast, substantially in the manner described.

2. Running the offal through the entire series of reels, substantially in the manner described, for the purpose of making the flour bolt more freely.

3. Rebolting the white middlings flour after regrinding and mixing them with offal, substantially in the manner described.

4. Conducting the flour made upon each reel into a separate compartment, substantially in the manner described, for the purpose of making a variety of grades, or of mixing them in any proportion desired, as set forth.

In testimony whereof I have hereunto subscribed my name.

WILLIAM F. COCHRANE.

Witnesses:
S. A. BOWMAN,
WARDER CUMMING.